US008989117B2

(12) United States Patent
Ramos et al.

(10) Patent No.: US 8,989,117 B2
(45) Date of Patent: Mar. 24, 2015

(54) ENHANCED DEDICATED-CHANNEL SIGNALING IN A CELL_FACH STATE

(75) Inventors: Edgar Ramos, Espoo (FI); Henrik Enbuske, Stockholm (SE); Jose Luis Pradas, Jorvas (FI); Paulson Angelo Vijay Silveris, Spånga (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 165 days.

(21) Appl. No.: 13/585,944

(22) Filed: Aug. 15, 2012

(65) Prior Publication Data
US 2013/0208668 A1 Aug. 15, 2013

Related U.S. Application Data

(60) Provisional application No. 61/524,131, filed on Aug. 16, 2011.

(51) Int. Cl.
*H04W 4/00* (2009.01)
*H04W 76/06* (2009.01)
*H04W 74/08* (2009.01)

(52) U.S. Cl.
CPC ........ *H04W 76/066* (2013.01); *H04W 74/0833* (2013.01)
USPC ....................................................... 370/329

(58) Field of Classification Search
CPC ..... H04W 72/04; H04W 88/08; H04W 76/00; H04W 80/04; H04W 84/12; H04W 84/08; H04W 76/02; H04W 74/0816

USPC ......... 370/329, 328, 338, 351, 341, 348, 236, 370/342, 350.324; 455/403, 450, 453, 1
See application file for complete search history.

(56) References Cited

U.S. PATENT DOCUMENTS

| 8,149,773 | B2 | 4/2012 | Sambhwani et al. |
| 2010/0203915 | A1 | 8/2010 | Baker et al. |
| 2012/0002617 | A1* | 1/2012 | Vujcic ............................ 370/329 |

OTHER PUBLICATIONS

3RD Generation Partnership Project. "Further Downlink Enhancements to CELL_FACH." 3GPP TSG RAN WG1 Meeting #66, R1-112616, Athens, Greece, Aug. 22-26, 2011.

(Continued)

*Primary Examiner* — Chi H Pham
*Assistant Examiner* — Alexander O Boakye
(74) *Attorney, Agent, or Firm* — Murphy, Bilak & Homiller, PLLC

(57) ABSTRACT

A new set of random-access preamble signatures are introduced to differentiate new-release UEs from UEs compliant only with earlier releases. Additional new features of a random-access procedure are also disclosed, including an ability to deploy multiple transmission-time-intervals TTIs) in a given area. An example mobile terminal, according to some embodiments of the present invention, selects a TTI from two or more possible TTIs. The mobile terminal then selects a preamble signature from a group of one or more preamble signatures associated with enhanced-uplink resources and associated with the selected TTI, and transmits a random-access channel (RACH) preamble, using the selected preamble signature. In some embodiments, the mobile terminal selects between a 2-millisecond TTI and a 10-millisecond TTI.

15 Claims, 9 Drawing Sheets

(56) References Cited

OTHER PUBLICATIONS

3RD Generation Partnership Project. 3GPP TS 25.211, V10.0.0 (Sep. 2010). 3rd Generation Partnership Project; Technical Specification Group Radio Access Network; Physical channels and mapping of transport channels onto physical channels (FDD) (Release 10). Sep. 2010.

3RD Generation Partnership Project. 3GPP TS 25.214, V10.3.0 (Jun. 2011). 3rd Generation Partnership Project; Technical Specification Group Radio Access Network; Physical layer procedures (FDD) (Release 10). Jun. 2011.

3RD Generation Partnership Project. 3GPP TS 25.321, V10.3.0 (Jun. 2011). 3rd Generation Partnership Project; Technical Specification Group Radio Access Network; Medium Access Control (MAC) protocol specification (Release 10). Jun. 2011.

3RD Generation Partnership Project. 3GPP TS 25.331, V10.4.0 (Jun. 2011). 3rd Generation Partnership Project; Technical Specification Group Radio Access Network; Radio Resource Control (RRC); Protocol specification (Release 10). Jun. 2011.

* cited by examiner

ENHANCED DEDICATED-CHANNEL SIGNALING IN A CELL_FACH STATE

BACKGROUND

This application claims the benefit of and priority to U.S. Provisional Application Ser. No. 61/524,131, filed 16 Aug. 2011. The entire contents of said U.S. Provisional Application are incorporated herein by reference.

BACKGROUND

The 3$^{rd}$-Generation Partnership Project (3GPP) is continuing development of the specifications for the Universal Terrestrial Radio Access Network (UTRAN). More particularly, work is ongoing to improve the end-user experience and performance in Release 11 of those specifications. These efforts include work to improve end-user experience and system performance in the CELL_FACH state.

CELL_FACH is a Radio Resource Control (RRC) state in which the end-user terminal (user equipment, or UE, in 3GPP terminology) is known on cell level (i.e., it has a cell ID) and has a layer 2 connection, but has no dedicated physical layer resource. Instead, the UE in CELL_FACH state must share common physical layer resources with other users in CELL_FACH state.

The Enhanced Dedicated Channel (E-DCH), which is an uplink packet-access channel, can be deployed so that it is may be used by UEs in CELL_FACH state. More usually, E-DCH is used as a dedicated channel in CELL_DCH state, in which case a separate resource is allocated for each user. When E-DCH is used in CELL_FACH state, however, the system uses a pool of E-DCH resources that can each be temporarily assigned to a UE in CELL_FACH state.

This common pool of E-DCH resources is referred to herein as "common E-DCH resources." E-DCH resources are normally managed by the Radio Network Controller (RNC), but the pool of common E-DCH resources is instead managed by the NodeB (3GPP terminology for a base station.) Configuration data specifying the E-DCH configurations are broadcasted to UEs in the cell.

FIG. 1 illustrates common E-DCH transmission in CELL_FACH state. Shown at the top is the Primary Physical Common Control Channel (P-CCPCH), a downlink physical channel that carries the broadcast control channel (BCH), which in turn carries system- and cell-specific information for UEs, such as indicators that specify which uplink scrambling codes are to be used. The P-CCPCH also serves as a timing reference for all physical channels.

The next channel illustrated in FIG. 1 is the Acquisition Indicator Channel (AICH). This physical channel is used to carry Acquisition Indicators (AIs), which correspond to preamble signatures transmitted by UEs and which are used by the NodeB to acknowledge the receipt of Physical Random Access Channel (PRACH) transmissions by UEs. The AICH can simultaneously acknowledge up to 16 PRACH preambles.

As shown in the next line of FIG. 1, labeled "RACH," the procedure to access the common E-DCH channel in CELL_FACH begins in the same way as a Release-99 Random Access Channel (RACH), i.e., with preamble power ramping using randomly selected preamble signatures. In the illustrated scenario, the UE transmits a preamble in slots #0 and #3, with the second transmission having a higher power level. Having detected the second preamble transmission by the UE, the NodeB acknowledges the UE's PRACH transmission with an AICH sequence, in slot #6. It also informs the UE which common E-DCH resource it has assigned to the UE. The UE can then use the E-DCH resource, as shown in FIG. 1, beginning with slot #7. Also shown in FIG. 1 are the Enhanced Absolute Grant Channel (E-AGCH) and the Fractional Dedicated Physical Channel (F-DPCH), which are downlink channels used to control uplink transmissions. Not shown are the Enhanced Relative Grant Channel (E-RGCH) and the Enhanced Hybrid-ARQ Indicator Channel (E-HICH), which are additional downlink channels for controlling the uplink.

A common E-DCH resource is defined as a particular combination of the following: an uplink scrambling code; an E-DCH Radio Network Temporary Identifier (E-RNTI); an F-DPCH code and timing offset; E-AGCH/E-RGCH/E-HICH codes and signatures; and parameters for use by the UE in uplink High-Speed Dedicated Physical Control Channel (HS-DPCCH) transmissions, such as power offsets and Channel Quality Report configuration information.

As of Release 10 of the 3GPP standards, the CELL_FACH state is commonly used to provide an efficient use of radio resources for UEs when data is arriving in bursts, with longer idle periods in between. The goals include both an efficient use of the UE's limited battery resources, as well as an efficient use of the network's radio resources. Ideally, an UE should be inactive between the bursts but still be capable of swiftly moving into an active state when there are packets to send or receive. For this kind of on-off type traffic patterns, the connection set-up latency and signaling load has a significant impact both on the preservation of the device battery and on the transmission quality perceived by the end user. In dormant periods, UEs are either sent to Idle state or are set to use configured Discontinuous Receive (DRX) schemes, to save battery.

Information specifying E-DCH resource configurations is broadcasted to UEs using SIB 5, which a system information block sent over the BCH. Some of the broadcasted parameters, such as the Transmission Time Interval (TTI), are common for all common E-DCH resources.

The specifications for E-DCH as of Release 10 of the 3GPP specifications are rather rigid and do not allow flexible configurations. One example is the Transmission Time Interval (TTI) for common E-DCH resources. Currently, two different TTIs may be configured: either 10-millisecond TTI or 2-millisecond TTI. However, for coverage reasons, the network is likely to have some common E-DCH resources configured with 10-millisecond TTI. As specified today, this implies that all resources must the same TTI. However, UEs in good radio conditions, e.g., in so-called hot spots, could make good use of common E-DCH resource with a shorter TTI, i.e. 2 milliseconds. A shorter TTI improves both uplink throughput and network capacity, since each resource is occupied for less time. Concurrent deployment of 2-millisecond and 10-millisecond TTI will thus introduce improvements and provide the network with the flexibility to make an effective and optimal utilization of the common E-DCH resources.

Another issue with current specifications is that E-DCH operation with 2-millisecond TTI does not support per-HARQ activation and de-activation for those common E-DCH resources. This feature is specified for CELL_DCH state. Per-HARQ-process activation/de-activation allows the network to keep a much closer control over the resources and the interference level. Per-HARQ-process activation/de-activation is performed by the NodeB. The problem resides in the fact that the Node-B does not have an explicit indication of the UE release. If per-HARQ-process activation/de-activation were to be standardized, there could be an inter-operability issue. If the Node-B sends an HARQ activation/de-activation order to a pre-Release-11 UE, i.e., a UE that is not compliant to Release 11 specifications, that UE will not act on that order according the specifications.

The utilization of common E-DCH resources may be inefficient for certain types of traffic, especially for very small packets like TCP ACKs. This inefficiency arises from the fact that the time from initial RACH preamble to active transition (the actual time depends on the system configuration) may be prefaced by DPCCH transmission, as well as that the relative overhead for a single, small payload transmission is rather large. In other words, the total resources used for control channel and signaling are relatively high, compared to very small transmissions like a TCP ACK.

Still other inefficiencies arise from the fact that the common E-DCH resource used by a UE is not released until all the HARQ processes have been acknowledged. This last issue means that common E-DCH resources are allocated for relatively long periods for the time actually needed for the transmission. From the network point of view, the network will wait at least one HARQ Round-Trip Time (RTT) from the last acknowledged HARQ process before it re-uses the resource for another UE. In practice, this means that the common E-DCH resource is occupied longer than a Resource-99 PRACH resource could be, given that only one packet is transmitted. Furthermore, in high load scenarios, the AICH NACK rate will increase due to the lack of common E-DCH resources.

To address some of these problems, a fallback approach is being standardized. With this approach, a Release-99 RACH process is used to access the network, even by Release-11 capable UEs, instead of using one of the common E-DCH resources. However, a similar problem to one of those noted above arises in the deployment of this fallback approach. Namely, the Node-B does not know the UE release. If the network wants to explicitly indicate to the UE to fall back to RACH using already specified Release-99 procedures, there will be interoperability issues, since pre-Release-11 UEs will not recognize and act on those orders. Additionally if new procedures are standardized, the NodeB needs to know which UEs are able to handle them.

In brief, the various significant issues with the use of E-DCH in CELL_FACH state include the following: how to control and configure the usage of the concurrent TTI configurations; individual UE capabilities are unknown before contention resolution; and network control is needed to handle overall interference, hardware resources, HARQ operation point, cell coverage, scheduling, etc.

SUMMARY

In some embodiments of the present invention, a new set of preamble signatures are introduced to differentiate UEs with new capabilities, e.g., those UEs that are capable of supporting CELL_FACH enhancements introduced in Release 11 of the 3GPP standards, from UEs compliant only with earlier releases. In addition to using a new set of preamble signatures that distinguish those UEs capable of performing the new RACH procedures, embodiments of the present solution include one or more additional new features, including an ability to deploy multiple TTIs in a given area, where some of the configured common E-DCH resources correspond to one TTI (e.g., a 2-millisecond TTI) while others correspond to another (e.g., a 10-millisecond TTI). In several embodiments, this is facilitated by the introduction of a parameter that specifies or indicates a bitmap to identify the TTI (e.g., 2-millisecond or 10-millisecond) of each configured common E-DCH resources, such that, for example, each common E-DCH resource is associated with one of the bits in the bitmap and a bit value of 1 indicates one TTI value and a bit value of 0 indicates the other TTI value.

An example method, for implementation by a mobile terminal, begins with selecting a transmission-time interval (TTI) from two or more possible TTIs. The mobile terminal selects a preamble signature from a group of one or more preamble signatures associated with enhanced-uplink resources and associated with the selected TTI; and transmits a random-access channel (RACH) preamble, using the selected preamble signature. In some embodiments, the mobile terminal selects between a 2-millisecond TTI and a 10-millisecond TTI. In several embodiments, the mobile terminal first selects a physical random-access channel (PRACH) scrambling code from one or more PRACH scrambling codes available to 3GPP Release-11 mobile terminals, in which case the preamble is transmitted using the selected preamble signature and the selected PRACH scrambling code. In some embodiments, broadcast system information received by the mobile terminal specifies groups of preamble signatures associated with each of the two or more possible TTIs, for each of the one or more PRACH scrambling codes. In some embodiments, the broadcast system information includes a bitmap for each of the one or more PRACH scrambling codes, the bitmap having a bit for each of a plurality of enhanced-uplink resource configurations, each bit indicating which of two possible TTIs is associated with the corresponding enhanced-uplink resource configuration.

In some cases, the mobile terminal receives an acknowledgement indicator corresponding to the selected preamble signature, in which case the mobile terminal transmits data using the selected TTI and using an enhanced-uplink resource configuration corresponding to the selected preamble signature. In other cases, the mobile terminal receives a negative acknowledgement indicator corresponding to the selected preamble signature, but also receives an extended acknowledgement indicator value. In these cases, the mobile terminal transmits data using an enhanced-uplink resource configuration corresponding to the extended acknowledgement indicator value. Note that this may involve transmitting data using a TTI other than the selected TTI. Determining that a TTI other than the selected TTI is to be used may be based on broadcasted system information that specifies a mapping between each uplink resource configuration and a TTI, in some embodiments.

Methods for determining when to fall back to fallback random-access resources (e.g., Release-99 RACH resources) are also disclosed, and may be combined with the methods summarized above. In one such method, after transmitting a random-access preamble, a mobile terminal receives a negative acknowledgement indicator corresponding to the selected preamble signature and receives an extended acknowledgement indicator value, but determines that the received extended acknowledgement indicator value is signaling a fallback to fallback random-access resources, e.g., a fallback to the legacy random-access procedure and legacy random-access resources specified by Release 99 of the 3GPP specifications. The mobile terminal then initiates a fallback random-access procedure, using a preamble signature selected from a group of one or more preamble signatures corresponding to the fallback random-access resources. In some embodiments, the received extended acknowledgement indicator value is an indicator value reserved, from a plurality of possible indicator values, to indicate a fallback to fallback random-access resources. As noted above, in some embodiments the fallback random-access resources are 3GPP Release-99 random-access resources and the fallback random-access procedure is a 3GPP Release-99 random-access procedure.

Corresponding methods for supporting uplink random-access procedures, as carried out by a base station, are also disclosed. For instance, one such method begins with receiving a random-access channel (RACH) preamble transmitted by a mobile terminal, wherein the RACH preamble uses a preamble signature and a physical random-access channel (PRACH) scrambling code. This is followed by determining which of two or more possible transmission-time intervals (TTIs) is being requested by the mobile terminal, based on the preamble signature and the PRACH scrambling code. Other methods detailed below include methods for signaling a fallback to fallback random-access resources.

Several of the methods summarized above may be implemented using electronic data processing circuitry provided in a mobile terminal. Likewise, others of the methods summarized above may be implemented using electronic data processing circuitry provided in a base station. Each mobile terminal and base station, of course, also includes suitable radio circuitry for receiving and transmitting radio signals formatted in accordance with known formats and protocols, e.g., Wideband-CDMA and High-Speed Packet Access formats and protocols. Accordingly, mobile terminal apparatus and base station apparatus adapted to carry out any of these techniques are described in detail in the discussion that follows.

Of course, the present invention is not limited to the above-summarized features and advantages. Indeed, those skilled in the art will recognize additional features and advantages upon reading the following detailed description, and upon viewing the accompanying drawings.

DETAILED DESCRIPTION

In the discussion that follows, specific details of particular embodiments of the present invention are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the present invention may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 1:
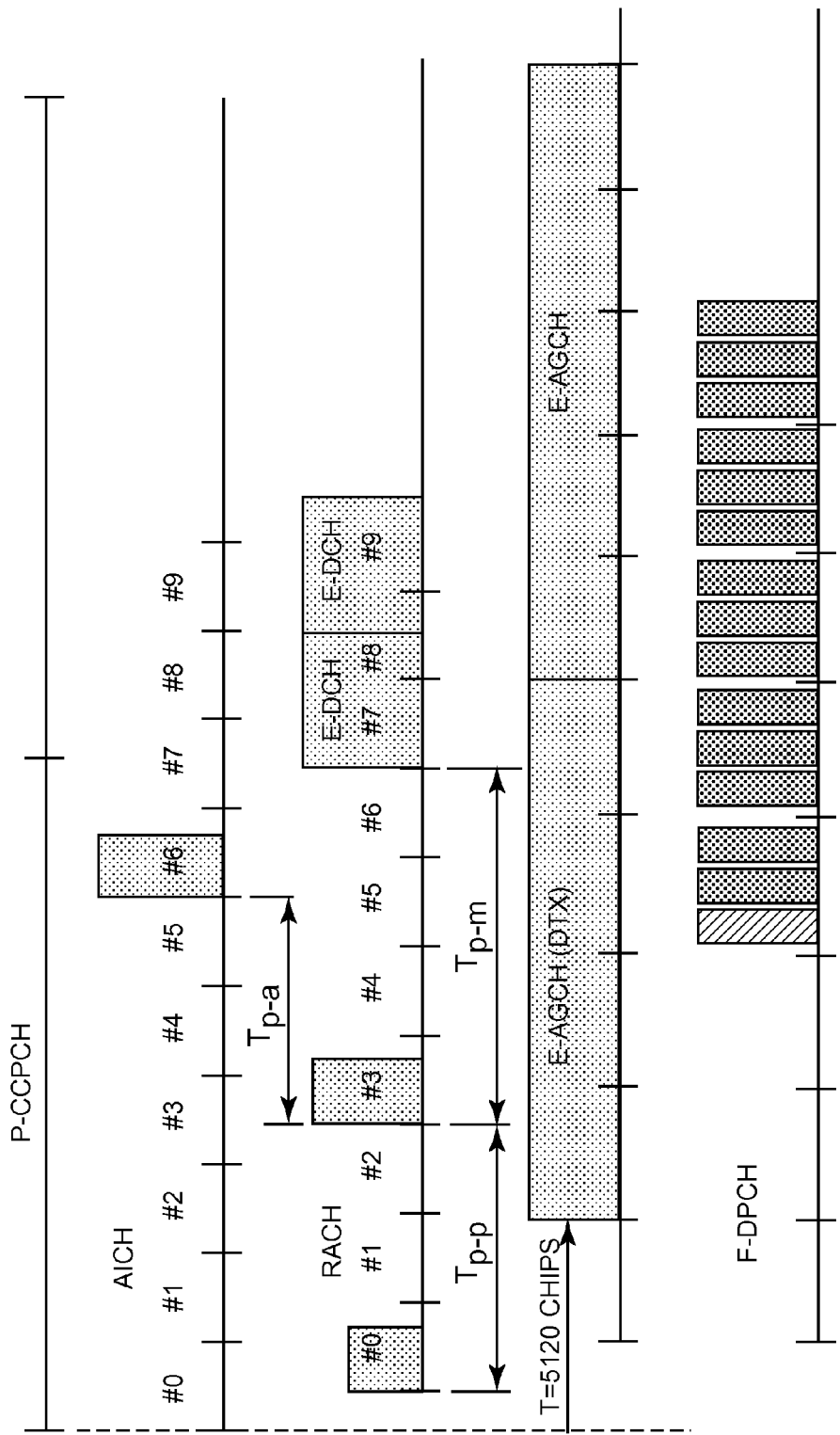
FIG. 1 illustrates common Enhanced Dedicated Channel transmission in CELL_FACH state.
Figure 2:
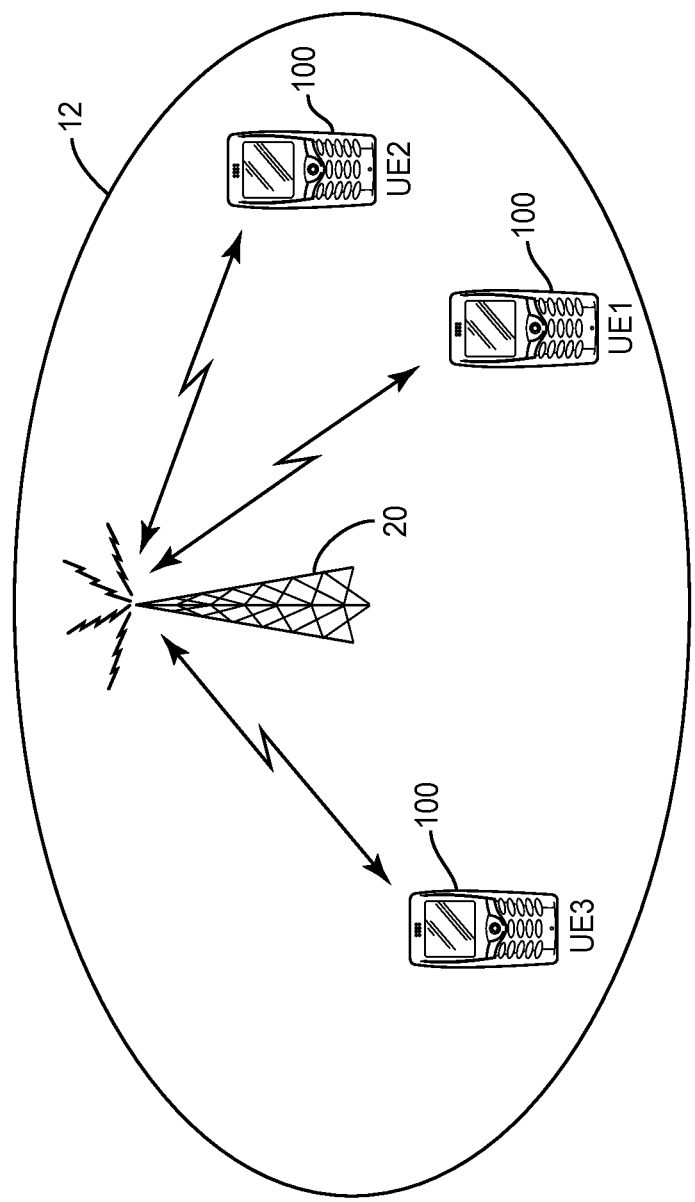
FIG. 2 illustrates a wireless network including a base station and one or more mobile terminals configured according to the present invention.

Referring now to the drawings, FIG. 2 illustrates an exemplary mobile communication network 10 for providing wireless communication services to mobile terminals 100. Three mobile terminals 100, which are referred to as "user equipment" or "UE" in 3GPP terminology, are shown in FIG. 1. The mobile terminals 100 may comprise, for example, cellular telephones, personal digital assistants, smart phones, laptop computers, handheld computers, or other devices with wireless communication capabilities. It should be noted that the term "3mobile terminal," as used herein, refers to a terminal operating in a mobile communication network and does not necessarily imply that the terminal itself is mobile or moveable. Thus, the term may refer to terminals that are installed in fixed configurations, such as in certain machine-to-machine applications, as well as to portable devices, devices installed in motor vehicles, etc.

The mobile communication network 10 comprises a plurality of geographic cell areas or sectors 12. Each geographic cell area or sector 12 is served by a base station 20, which is referred to in the UTRAN context as a NodeB. One base station 20 may provide service in multiple geographic cell areas or sectors 12. The mobile terminals 100 receive signals from base station 20 on one or more downlink (DL) channels, and transmit signals to the base station 20 on one or more uplink (UL) channels.

For illustrative purposes, several embodiments of the present invention will be described in the context of a UTRAN system. Those skilled in the art will appreciate, however, that several embodiments of the present invention may be more generally applicable to other wireless communication systems.

As explained above, as of the Release-10 specifications for UTRAN, some of the common E-DCH parameters are common for all common E-DCH resources. One of those parameters is the E-DCH TTI. Additionally, the signaling of UE capabilities to the NodeB is limited to the signaling of a supported release by the selection of PRACH preamble signature to two values, which indicate support (or lack thereof) for common E-DCH, i.e., support of Release-99 or Release-8 capabilities. One aspect of the techniques presented below is to allow the NodeB to identify a UE's capability new procedures (e.g., new RACH-related procedures specified in Release 11) by associating that capability with a preamble signature combined with specific PRACH scrambling codes.

In some embodiments of the present invention, this is done by introducing a new set of preamble signatures to to differentiate UEs with new capabilities, e.g., those UEs that are capable of supporting CELL_FACH enhancements introduced in Release 11 of the 3GPP standards, from UEs compliant only with earlier releases Note that in the present disclosure, those UEs are referred to as "Release 11 UEs." However, this term should be understood as well to refer to UEs that are also compliant to later versions of the 3GPP standard and that support the CELL_FACH enhancements described herein.

In addition to using a new set of preamble signatures that distinguish those UEs capable of performing the new RACH procedures, embodiments of the present solution include one or more additional new features, including an ability to deploy multiple TTIs in a given area, where some of the configured common E-DCH resources correspond to one TTI (e.g., a 2-millisecond TTI) while others correspond to another (e.g., a 10-millisecond TTI). In several embodiments described more fully below, this is facilitated by the introduction of a parameter that specifies or indicates a bitmap to identify the TTI (e.g., 2-millisecond or 10-millisecond) of each configured common E-DCH resources, such that, for example, each common E-DCH resource is associated with one of the bits in the bitmap and a bit value of 1 indicates one TTI value and a bit value of 0 indicates the other TTI value.

Another aspect of several embodiments of the invention is that there may be more than one defined PRACH configuration at a time. Accordingly, several sets of parameters, corresponding to several PRACH configurations, may be broadcasted by the network as part of the system information in a given cell. Table 1 illustrates an example of the parameters for a PRACH configuration, which include a PRACH scrambling code, and a set of one or more preamble signatures that are available for E-DCH. In addition, an E-DCH TTI bitmap, which maps each common E-DCH resource to one of at least two possible TTI values, is broadcast. Note that the terms "signature" and "preamble signature" are used interchangeably herein. Note also that Table 1 illustrates the parameters for only a single PRACH; similar sets of parameters may be broadcast for one or more additional PRACH configurations as well. It should also be understood that fewer or additional parameters might be used, in various embodiments.

TABLE 1

| PRACH Configuration (Rel-11) | <1 to maxPRACH> |
| --- | --- |
| >PRACH scrambling code | |
| >Signatures available for E-DCH | |
| >E-DCH TTI bitmap | |

The PRACH configuration parameters should be broadcasted as part of the network System Information (SI) by the cell. The configuration parameters are then read from the broadcasted message by a UE operating in the cell. A UE configured according to the present techniques selects an appropriate scrambling code configured to signal its release capability (e.g. Release-11). The UE also selects an initial TTI, i.e., a desired TTI, based on the network indications and/or parameters, and based on the UE's data needs, signal conditions, etc.

Every configured common E-DCH resource is associated with one or several preamble signatures per PRACH scrambling code. In the current standards, common E-DCH resources are mapped only by preamble signatures. See, e.g., Section 10.3.6.54a of the 3GPP document "Radio resource control (RRC) protocol specification," 3GPP TS 25.331, v.10.4.0 (July 2011), available at www.3gpp.org. In embodiments of the present invention, the E-DCH TTI bitmap effectively groups an initially reserved group of signatures, i.e., signatures associated with a selected PRACH scrambling code and available for E-DCH, into two sub-groups, one subgroup of signatures associated with common E-DCH resources configured for 2-millisecond TTI, and one subgroup of signatures associated with common E-DCH resources configured for 10-millisecond TTI.

In some embodiments, once the UE has selected the initial TTI (and a PRACH scrambling code, if more than one is available) the UE randomly selects one signature from the subgroup of signatures associated with the selected initial TTI. That selected signature is then used to initiate random access, using previously defined procedures as described in the background. Note that a systematic selection of the signatures associated with the selected TTI, rather than a random selection, may be used in some embodiments.

In some embodiments, the network broadcasts the bitmap indicating which common E-DCH resources use a different TTI from a default TTI. In some embodiments, the NodeB may be configured to dynamically update the bitmap to provide control of the desired TTI configuration at one specific time, or more generally at specific times. The default TTI in any of these embodiments may be the TTI that is broadcast in the System Information for all common E-DCH resources according to conventional procedures. (See Section 10.3.6.9a of the RRC protocol specification 3GPP TS 325.331 referred to above.) In some cases, this bitmap consists of a single bit per each common E-DCH resource. If the bit associated with a common E-DCH resource is set to 0, the TTI is the same as the default TTI. If the bit is set to 1, it would mean that the TTI is different from the default TTI. If the default TTI is 10 milliseconds, for example, it would mean that the TTI is 2 milliseconds. If the default TTI is 2 milliseconds, it would mean that the TTI is 10 milliseconds. Of course, the reverse coding of the bit could be used, in other embodiments.

It should be appreciated that the present techniques are independent of the techniques used to select a desired TTI. In some cases, a UE may select the desired TTI based on signal conditions, data throughput needs, and/or the like. In other embodiments, if the UE does not have criteria to select a TTI or if the criteria don't apply to the current access, then a default TTI configuration may be selected.

In some systems configured according to any of these techniques, the NodeB is configured to redirect the attempt of a UE to transmit with a TTI indicated by the UE's random access attempt, in some circumstances, by replying to the UE using an extended Acquisition Indication (E-AI) associated with a common E-DCH resource configured for a TTI other than the requested one. For example, if the UE's random access attempts indicate a 10-millisecond TTI, the Node B may reply to the UE using an E-AI associated with a configuration/common E-DCH resource having a 2-millisecond TTI. The UE should then start the transmission using the configuration/common E-DCH resource signaled by the Node B and the corresponding TTI.

In some systems configured according to the present invention, the random access techniques used above are used to enable handling of potential collisions in connection with activating a HS-DPCCH standalone transmission, which is an uplink transmission of CQI data that separate from any ongoing use of E-DCH resources. The NodeB is required to map the H-RNTI of the UEs to the E-RNTI. This mapping could be done by the information provided by dedicated signaling from RNC to NodeB over the Iub interface.

When the NodeB triggers an activation of a HS-DPCCH transmission, e.g., because of downlink data to be transmitted to the UE when there are no allocated uplink resources, it expects the UE to initiate a random access procedure to acquire an uplink resource and being able to transmit the HS-DPCCH. The random access procedure can be done following the above outline enhanced procedure. In case of a collision where two UEs attempt an access with the same resource, the network can recognize the colliding UE by the E-RNTI, which will differ from the expected E-RNTI associated to the H-RNTI of the UE with the activated HS-DPCCH. The colliding UE can then be released by using an "explicit release" procedure, using the E-RNTI present in the MAC-I, but the resource will be kept in order to serve the HS-DPCCH-activated UE.

Fallback to Release 99 RACH from common E-DCH transmission in IDLE and CELL_FACH sates is an important feature of 3GPP Release 11. Solutions for when the fallback to Release 99 RACH procedure takes place can be of several types, either controlled by the NodeB (using, e.g., AICH signaling) or by the UE itself (based on some suitable criterion), for instance depending simply on buffer content, configuration or on contention/load detected on Common E-DCH resources. Several methods for signaling the fallback to Release-99 PRACH, under the control of a NodeB, are discussed below.

Technique 1

According to previous system specifications, if the network is experiencing high load due to lack of common E-DCH resources, it commands the UE to back off and retry after a configurable amount of time, which is broadcasted in the system information. A similar mechanism can be used to command a UE to fall back to R99 PRACH.

In an example embodiment, such a mechanism works as follows:
1. A UE transmits a random access preamble with a signature allocated/available for common E-DCH access.
2. A NodeB detects the random access preamble. If no common E-DCH resources are available, e.g., due to the network experiencing high load, and/or if the condition to trigger a fall back is met, the NodeB transmits a grant using AICH/E-AICH as follows:
   a. AICH value=−1
   b. E-AICH value=a reserved index to indicate to UE to fall back to R99 PRACH.

Table 2 illustrates an example of this approach. Note that per previous standardization the UTRAN network indicates the NACK for common E-DCH random access via AICH signature '0' and a positive E-AICH value. In systems and UEs configured according to some embodiments of the present invention, the same signature, with a negative E-AICH value can be used to command the UE fallback to Release 99, as shown in Table 2.

TABLE 2

E-AI Resource Table

| $EAI_{s'}$ | $Signature_s'$ | E-DCH Resource configuration index |
|---|---|---|
| +1 | 0 | NACK |
| −1 |  | R99 PRACH Redirect |
| +1 | 1 | (X + 2) mod Y |
| −1 |  | (X + 3) mod Y |
| +1 | 5 | (X + 10) mod Y |
| −1 |  | (X + 11) mod Y |
| +1 | 6 | (X + 12) mod Y |
| −1 |  | (X + 13) mod Y |
| . | . | (X + 14) mod Y |
| . | . | . |
| . | . | . |
| +1 | 13 | . |
| −1 |  | (X + 27) mod Y |
| +1 | 14 | (X + 28) mod Y |
| −1 |  | (X + 29) mod Y |
| +1 | 15 | (X + 30) mod Y |
| −1 |  | (X + 31) mod Y |

Technique 2

A second approach to signalling fallback is described below:
1. The network signals new 'C-EDCH initial access reject max' parameter in SIB5/SIB5bis as part of "Common E-DCH system information" IE.
2. In the UE, the new parameter in addition to the existing parameters is passed from RRC to MAC layer, using the existing CMAC-Config-REQ.
3. The UE initiates the preamble transmission using the common E-DCH signatures.
   a. If the UE receives NACK, increment 'C-EDCH access reject counter'. If 'C-EDCH access reject counter' >'C-EDCH initial access reject max', then indicate failure with status 'C-EDCH access reject threshold.' In this case, the UE shall initiate the fallback to R99 RACH procedure. Otherwise, repeat step 3.
   b. If the UE receives an ACK, indicate ready for data transmission to the higher layers.

Figure 3A:
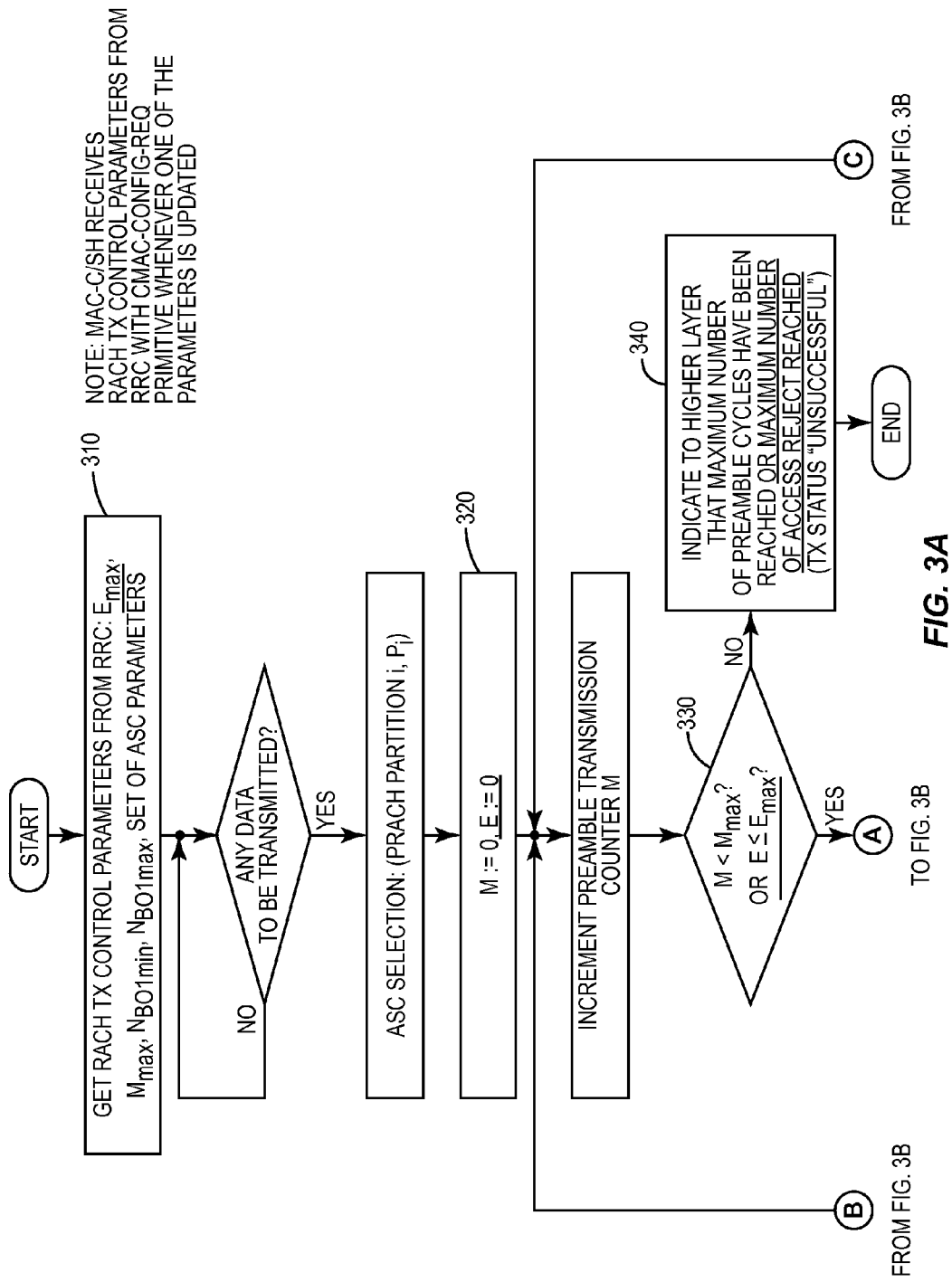
FIGS. 3A and 3B illustrate an example method for accessing uplink resources, according to some embodiments of the present invention.
Figure 3B:
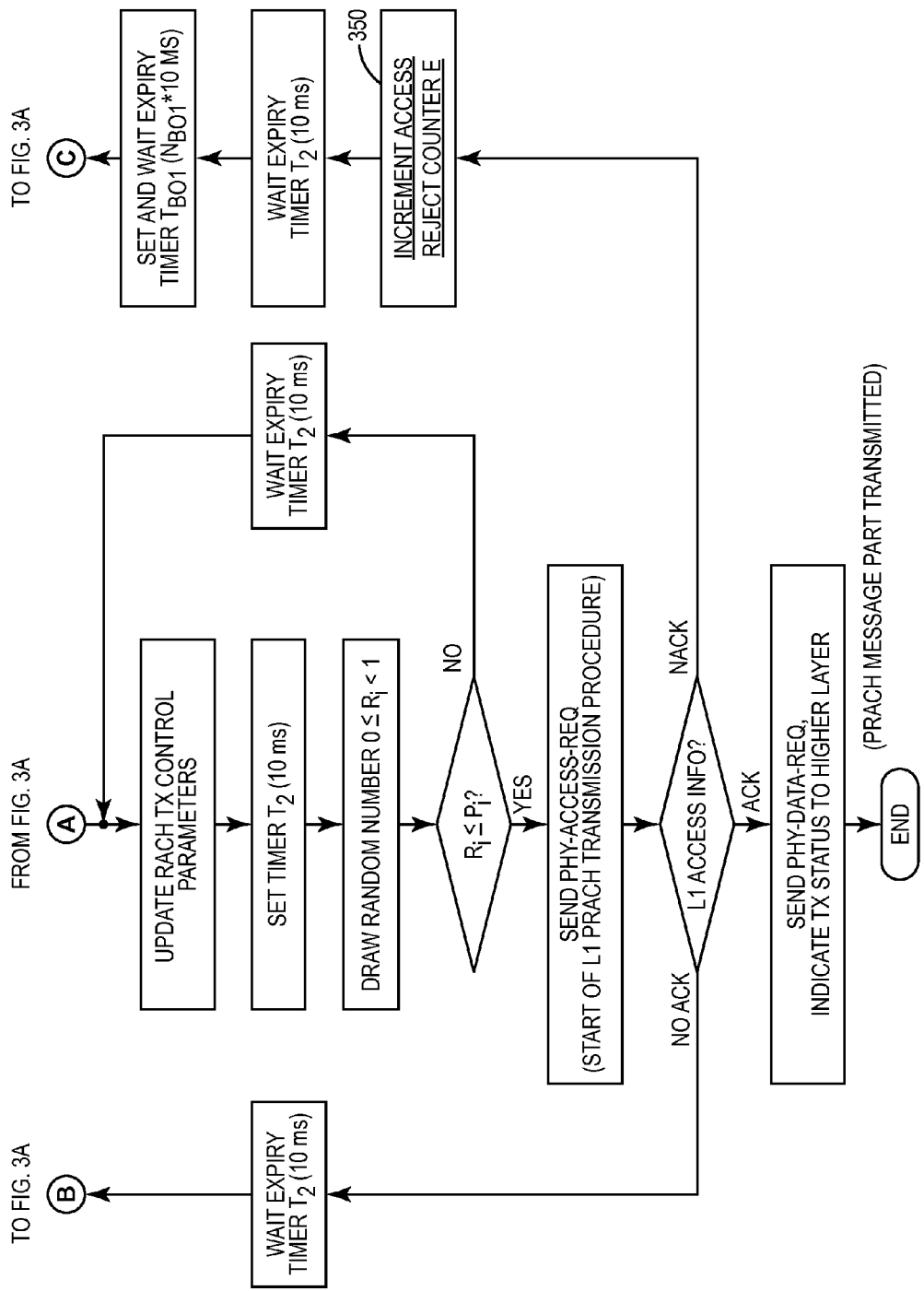

FIGS. 3A and 3B together illustrate the existing Enhanced UL CELL_FACH random access procedure, but as modified by the present technique. Note that E indicates the access reject counter, while $E_{MAX}$ indicates the maximum number of access rejections. The portions of the procedure illustrated in FIG. 3 that are modified by the above description are identified as blocks 310, 320, 330, 340, and 350; specific modifications are indicated by the underlined text in those blocks.

Technique 3:

In yet another approach, the downlink channel Acquisition Indicator Channel (AICH) can be used to indicate a redirect to R99 RACH, using the unused part of the AICH slots, i.e., the part with no transmission/reserved for possible future use.

Figure 4:
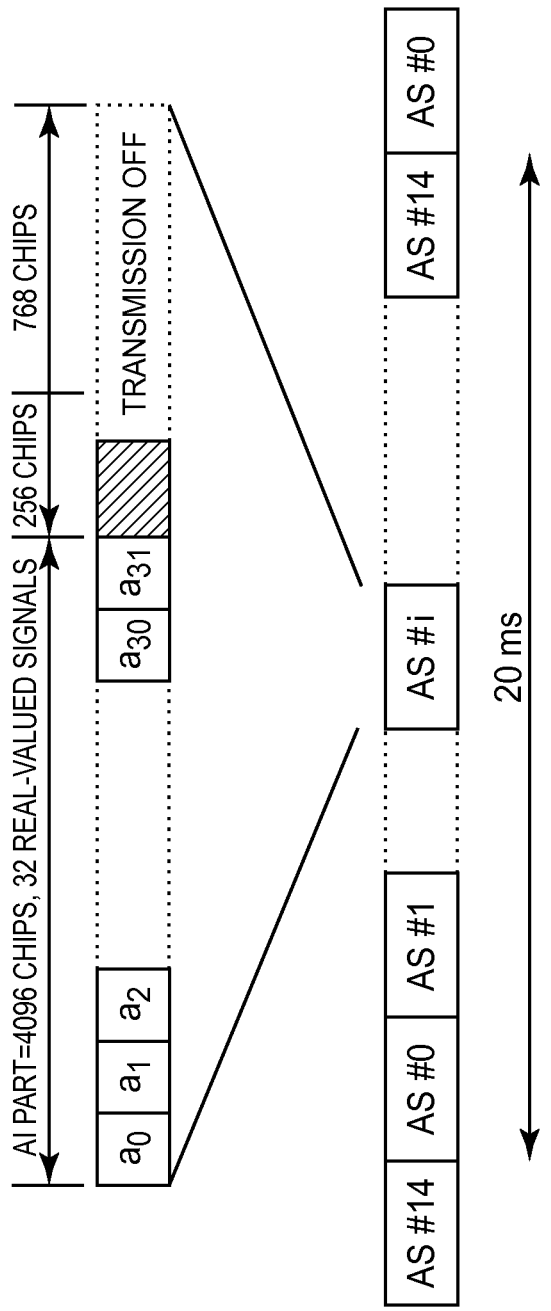
FIG. 4 illustrates details of the ARQ Indicator Channel.

The solution uses up to a maximum of 4 bits to transmit additional information to UE in the AICH channel. FIG. 4 illustrates this approach, where an additional 1 bit (represented by the cross-hatched box following "a31" in the figure) is transmitted in an AICH slot to signal the redirect to Release-99 RACH procedures for the Release 11 (or later) UE. The bit can represent either "redirect on", e.g., with a value of 1, or "redirect off," e.g., with a value of 0. As it is currently unused, it will be ignored by UEs not compliant with the new specification.

In some systems, then, when the Node B detects a random access preamble transmitted by a UE with a signature associated with common E-DCH access, the Node B may use an additional 1 bit in the AICH to signal the UE that it is redirected to Release-99 RACH. Upon receiving the indication from the Node B that it is redirected to Release-99 RACH, the UE then performs a Release-99 random access, i.e., by initiating transmission of a random access preamble using a signature associated indicating Release-99 random access.

Technique 4:

In still another approach, a modification of the existing 3GPP back-off solution in common E-DCH can be used to signal the fallback to Release-11 UEs. When a Release-11 UE receives the AICH NACK, it should retry the ramping using Release-99 RACH procedures. Once the UE receives the NACK, it should transmit immediately the RACH preambles. In some embodiments, this transmission is at the same power level or at a power level close to the power level the UE last used before it received the NACK. This approach is outlined as follows:

1. if (AI and E-AI=NACK), and if the UE is Release-11 compliant:
   a. do not apply back-off, and
   b. start the random access in the next available access slot with P=Pbefore+delta (delta could be negative), using a signature allocated for Release 99 RACH procedures.
2. else
   a. apply back-off as specified in Release 8.

Note that this approach can be viewed as a special case of the approach described above as "Technique 1." In that first approach, a particular E-AICH value indicates a fallback to Release 99 procedures. In this approach ("Technique 4"), an E-AI of NACK triggers the fallback procedure.

Technique 5:

In CELL_FACH state, the fallback to R99 RACH will require an autonomous reconfiguration of the L2 layer in UE (fixed to flexible rlc and mac-i/is to mac-c). Note that in Enhanced Uplink CELL_FACH operation, the Signaling Radio Bearers (SRBs) 1, 2, 3, 4, are still configured with fixed size Radio Link Control (RLC). Hence, the UE can transmit uplink Common Control Channel (CCCH) messages using Release-99 RACH procedures, without reconfiguring the RLC layer in case of fallback to R99 RACH.

According to this fifth approach, the network-controlled fallback to Release-99 RACH' works as follows:

1. The network indicates UE to redirect to R99 RACH.
2. UE initiates a cell update procedure with a new cause value (e.g. 'common E-DCH resource unavailable') via SRB 2 (fixed-size RLC, using uplink CCCH messages) and configuring the MAC as per the PRACH information provided in the System broadcast.
3. The Network (RNC) on reception of cell update with the new cause value, shall decide to up switch the UE to CELL_DCH or CELL_FACH(RACH/FACH), based on the ongoing traffic volume measurements via cell update confirm message.

Figure 5:
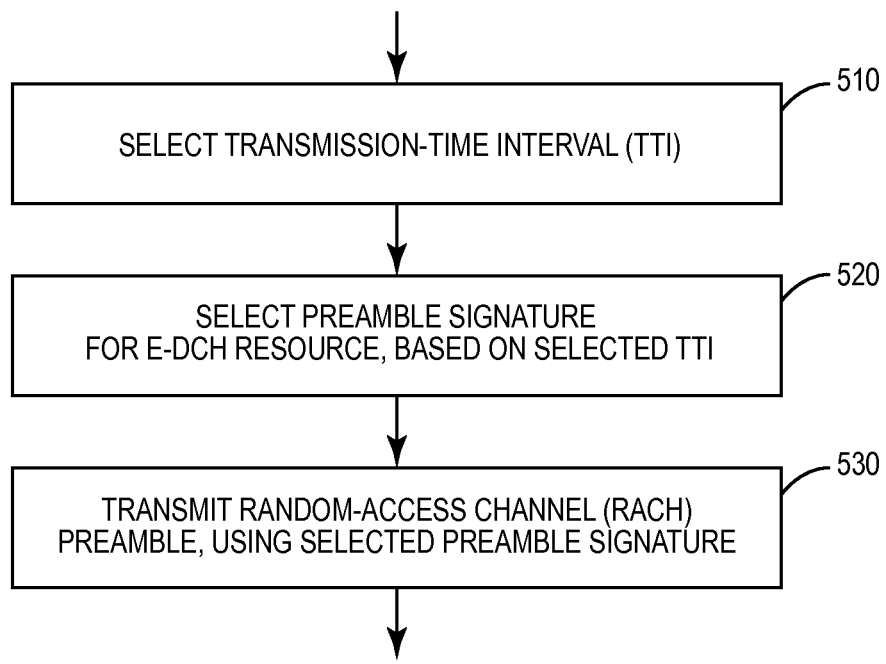
FIG. 5 is a process flow diagram illustrating an example method as implemented in a mobile terminal.

The process flow diagram of FIG. 5 illustrates a generalized method for accessing uplink resources in a wireless network according to several of the techniques described above. This method, which is suitable for implementation by a mobile terminal (e.g., a UE compliant with the forthcoming 3GPP Release 11 standards), is applicable in a wireless network that supports an enhanced-uplink random-access procedure for accessing enhanced-uplink resources, as in the common E-DCH resources discussed above, and a fallback random-access procedure for access to fallback random-access resources, such as Release-99 RACH resources.

As shown at block 510, the method begins with selecting a TTI from two or more possible TTIs, such as between a 2-millisecond TTI and a 10-millisecond TTI. Next, as shown at block 520, a preamble signature is selected, from a group of one or more preamble signatures associated with enhanced-uplink resources and associated with the selected TTI. Next, as shown at block 530, a random-access channel (RACH) preamble is transmitted, using the selected preamble signature.

Although not shown in the process flow of FIG. 5, the illustrated technique may be preceded by the selection of a physical random-access channel (PRACH) scrambling code from one or more PRACH scrambling codes allocated to 3GPP Release-11 mobile terminals. The RACH preamble is transmitted using the selected preamble signature and the selected PRACH scrambling code. In some cases, the mobile terminal will receive broadcast system information specifying groups of preamble signatures associated with each of the two or more possible TTIs, for each of the one or more PRACH scrambling codes allocated to Release-11 mobile terminals. Again, it should be understand that "Release-11 mobile terminal" is meant here to refer to any mobile terminal that is compliant with Release 11 standard, including those that are also compliant with one or more subsequent releases.

The broadcast system information received by the mobile terminal may in some cases comprise a bitmap for each of the one or more PRACH scrambling codes. This bitmap has bit for each of a plurality of enhanced-uplink resource configurations, each bit indicating which of two possible TTIs is associated with the corresponding enhanced-uplink resource configuration. The mobile terminal uses the bitmap to divide the enhanced-uplink resource configurations into two groups, associated with the possible TTIs. Because each preamble signature is associated with an enhanced-uplink resource configuration, this bitmap also serves to divide the available preamble signatures into two groups, again associated with corresponding TTIs. The mobile terminal selects a preamble signature from the appropriate group. Note that in some cases the bitmap may differ from one scrambling code to another, while in others a single bitmap applies to all scrambling codes.

Figure 6:
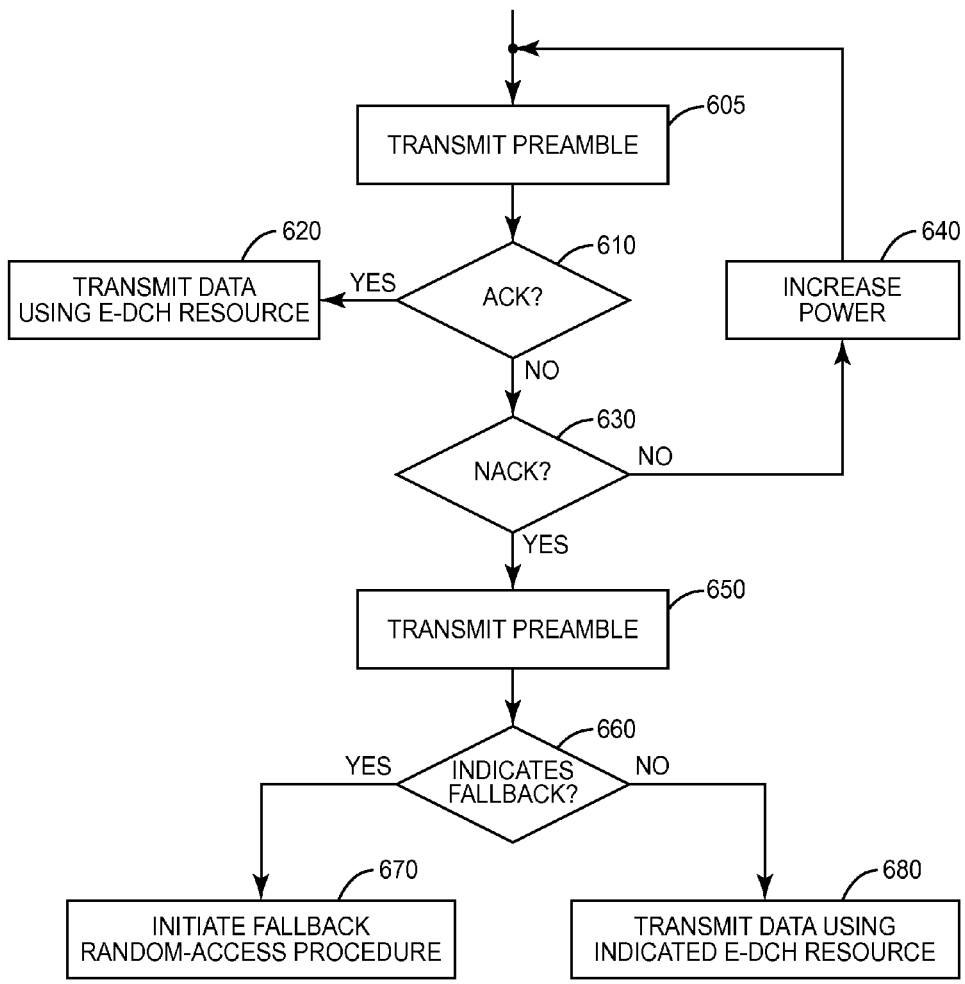
FIG. 6 illustrates details of an example method for access uplink resources according to a fallback random-access procedure.

FIG. 6 illustrates another process flow for implementation by a mobile terminal, in this case illustrating an example approach to facilitating a fallback to a fallback random-access procedure using fallback random-access resources. Note that the process illustrated in FIG. 6 may be combined with the process illustrated in FIG. 5.

The illustrated process begins, as shown at block 605, with the transmission of a PRACH preamble, using an appropriately selected preamble signature corresponding to an enhanced-uplink resource. It should be appreciated that this preamble signature may be selected according to the process illustrated in FIG. 5, in some embodiments, in which case the operation illustrated at block 605 corresponds directly to the operation shown at block 530 of FIG. 5.

After transmitting the preamble signature, the mobile terminal monitors the acknowledgement indicator channel (AICH) for an acknowledge indicator. If neither an AICH ACK nor an AICH NACK is received in response (see blocks 610 and 630), then the preamble transmission power is increased, as shown at block 640, and repeated. If an AICH ACK is received, then the mobile terminal transmits data on the enhanced-uplink resource that corresponds to the transmitted preamble signature, as shown at block 620, using the corresponding TTI.

If an AICH NACK is received, on the other hand, the mobile terminal receives and evaluates an extended acknowledgement indicator value, as shown at block 650. In some instances the extended acknowledgement indicator value will indicate a fallback (redirection) to a fallback random-access procedure, as seen at block 660. For example, the received extended acknowledgement indicator value may be an indicator value reserved, from a plurality of possible indicator values, to indicate a fallback to fallback random-access resources. In this case, the mobile terminal initiates a fallback random-access procedure, using a preamble signature selected from a group of one or more preamble signatures corresponding to the fallback random-access resources.

In other instances, the extended acknowledgement indicator value will instead point to an enhanced-uplink resource configuration, in which case the mobile terminal proceeds by transmitting data using the enhanced-uplink resource configuration corresponding to the extended acknowledgement indicator value. Note that in some cases this enhanced-uplink resource configuration may correspond to a TTI other than the TTI initially selected by the mobile terminal. As discussed earlier, in some embodiments this may be determined by consulting broadcasted system information that specifies a mapping between each uplink resource configuration and a TTI, e.g., a bitmap that indicates which uplink resource configurations correspond to each possible TTI.

Of course, the fallback random-access resources in the process illustrated in FIG. 6 may be 3GPP Release-99 random-access resources, and the fallback random-access procedure a 3GPP Release-99 random-access procedure, in some embodiments. The illustrated approach may be applied to other systems, however.

Figure 7:
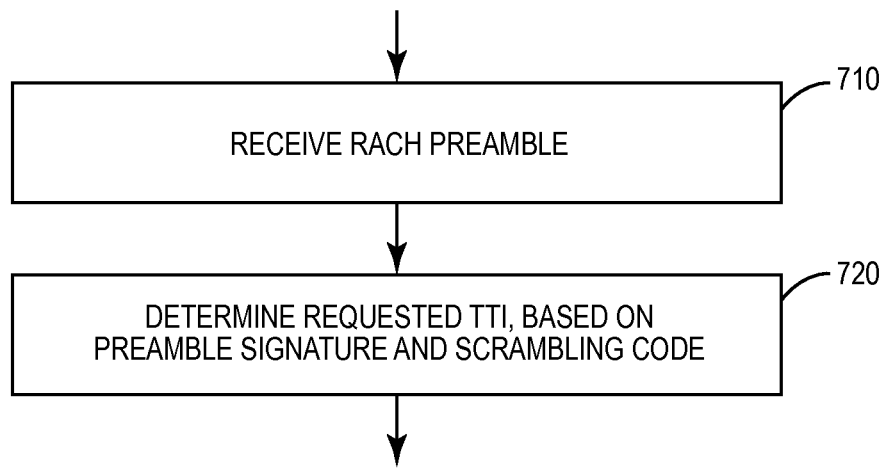
FIG. 7 is a process flow diagram illustrating an example method as implemented in a base station.

The process flow diagram of FIG. 7 illustrates a method, implemented by a base station, which complements the mobile terminal-based methods of FIGS. 5 and 6. As seen at block 710, the illustrated method for supporting uplink random-access procedures begins with receiving a random-access channel (RACH) preamble transmitted by a mobile terminal, where the RACH preamble uses a preamble signature and a physical random-access channel (PRACH) scrambling code. As seen at block 720, the method continues with the determination of which of two or more possible transmission-time intervals (TTIs) is being requested by the mobile terminal, based on the preamble signature and the PRACH scrambling code.

The possible TTIs may consist of two-millisecond TTI and a ten-millisecond TTI, in some embodiments. Although this operation is not pictured in FIG. 7, the illustrated process may be preceded by the transmitting of system information specifying a group of preamble signatures for each of the two or more possible TTIs, for each of one or more physical random-access channel (PRACH) scrambling codes. In some cases, this system information may include a bitmap having a bit for each of a plurality of enhanced-uplink resource configurations, each bit indicating which of two possible TTIs is associated with the corresponding enhanced-uplink resource configuration.

Steps taken by the base station after the preamble is received and decoded will depend, for example, on the available resources. Several responses by the base station are possible. In some cases, the base station will choose to grant the mobile terminal's request for a specific enhanced-uplink resource. In these cases, the base station transmits an acknowledgement indicator corresponding to the preamble signature, and subsequently receives data transmitted by the mobile terminal, using the requested TTI and using an enhanced-uplink resource configuration corresponding to the preamble signature.

In other cases, the base station will refer the mobile terminal to another enhanced-uplink resource, possibly one corresponding to a TTI other than requested. In these cases, the base station transmits a negative acknowledgement indicator corresponding to the preamble signature and transmits an extended acknowledgement indicator value corresponding to an enhanced-uplink resource configuration, after which it receives data transmitted by the mobile terminal using the enhanced-uplink resource configuration.

In still other cases, a base station configured according to some embodiments of the present invention will redirect the mobile terminal to a fallback random-access procedure, e.g., the Release-99 RACH procedure. In these cases, the base station transmits a negative acknowledgement indicator corresponding to the selected preamble signature and transmits a particular extended acknowledgement indicator value that signals a fallback to fallback random-access resources. Subsequently, the base station receives a fallback random-access preamble transmitted by the mobile terminal, the fallback random-access preamble using a preamble signature selected from a group of one or more preamble signatures corresponding to the fallback random-access resources.

The operations illustrated in the process flow diagrams of FIGS. 5 and 6 may be implemented using electronic data processing circuitry provided in the mobile terminal. Likewise, the operations in the flowchart of FIG. 7 may be implemented using electronic data processing circuitry provided in a base station. Each mobile terminal and base station, of course, also includes suitable radio circuitry for receiving and transmitting radio signals formatted in accordance with known formats and protocols, such as the formats and protocols specified by 3GPP for UTRAN.

Figure 8:
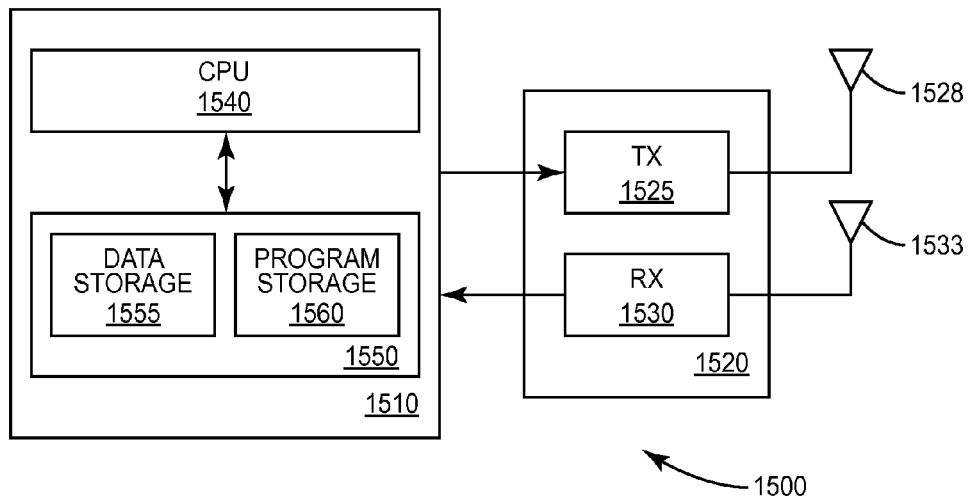
FIG. 8 is a block diagram illustrating components of a radio node, according to several embodiments of the invention.

FIG. 8 illustrates features of an example communications node 1500 according to several embodiments of the present invention. Although the detailed configuration, as well as features such as physical size, power requirements, etc., will vary, the general characteristics of the elements of communications node 1500 are common to both a wireless base station and a mobile terminal. Further, both may be adapted to carry out one or several of the techniques described above for managing and access uplink resources in a wireless network.

Communications node 1500 comprises a transceiver 1520 for communicating with mobile terminals (in the case of a base station) or with one or more base stations (in the case of a mobile terminal) as well as a processing circuit 1510 for processing the signals transmitted and received by the transceiver 1520. Transceiver 1520 includes a transmitter 1525 coupled to one or more transmit antennas 1528 and receiver 1530 coupled to one or more receive antennas 1533. The same antenna(s) 1528 and 1533 may be used for both transmission and reception. Receiver 1530 and transmitter 1525 use known radio processing and signal processing components and techniques, typically according to a particular telecommunications standard such as the 3GPP standards for Wideband CDMA (W-CDMA) and High-Speed Packet Access (HSPA). Because the various details and engineering tradeoffs associated with the design and implementation of such circuitry are well known and are unnecessary to a full understanding of the invention, additional details are not shown here.

Processing circuit 1510 comprises one or more processors 1540, hardware, firmware or a combination thereof, coupled to one or more memory devices 1550 that make up a data storage memory 1555 and a program storage memory 1560. Memory 1550 may comprise one or several types of memory such as read-only memory (ROM), random-access memory, cache memory, flash memory devices, optical storage devices, etc. Again, because the various details and engineering tradeoffs associated with the design of baseband processing circuitry for mobile devices and wireless base stations are well known and are unnecessary to a full understanding of the invention, additional details are not shown here.

Typical functions of the processing circuit 1510 include modulation and coding of transmitted signals and the demodulation and decoding of received signals. In several embodiments of the present invention, processing circuit 1510 is adapted, using suitable program code stored in program storage memory 1560, for example, to carry out one of the techniques described above for accessing uplink resources from a mobile terminal or for supporting uplink random-access procedures in a base station. Of course, it will be appreciated that not all of the steps of these techniques are necessarily performed in a single microprocessor or even in a single module.

Figure 9:
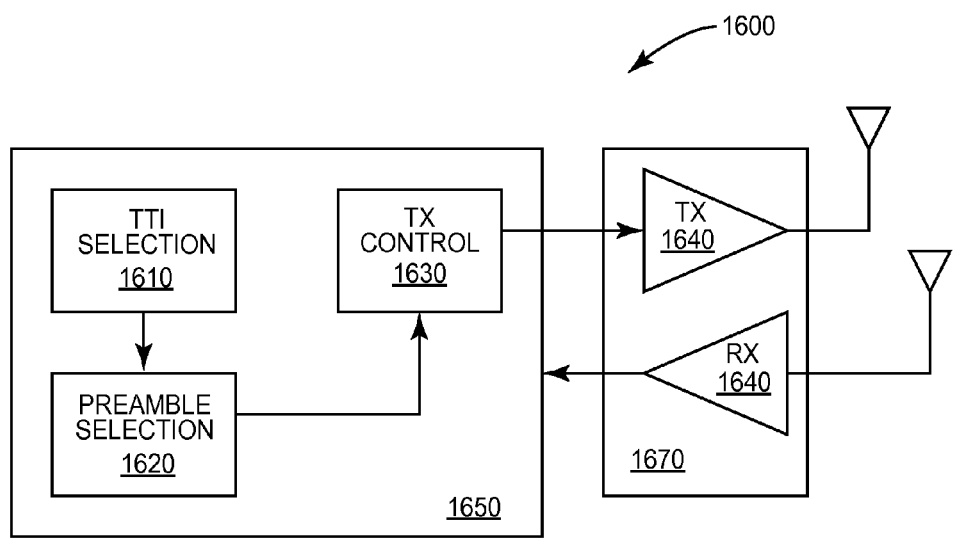
FIG. 9 is a block diagram illustrating functional elements of an example mobile terminal.

FIG. 9 illustrates several functional elements of a mobile terminal 1600, adapted to carry out some of the techniques discussed in detail above. Mobile terminal 1600 includes a TTI selection circuit 1610 configured to select a TTI from two or more possible TTIs, and a preamble signature selection circuit 1620 configured to select a preamble signature from a group of one or more preamble signatures associated with enhanced-uplink resources and associated with the selected TTI. Mobile terminal 1600 further includes a transmit control circuit 1630, which is configured to control transmitter circuit 1640 to transmit a random-access channel preamble, using the selected preamble signature. In the pictured example, TTI selection circuit 1610, preamble signature selection circuit 1620, and transmit control circuit 1630, make up part of an uplink processing circuit 1650, which may be configured in the same manner as processing circuit 1510 in FIG. 8. Likewise, transmitter 1640 circuit, along with receiver circuit 1660, makes up part of transceiver 1670.

Figure 10:
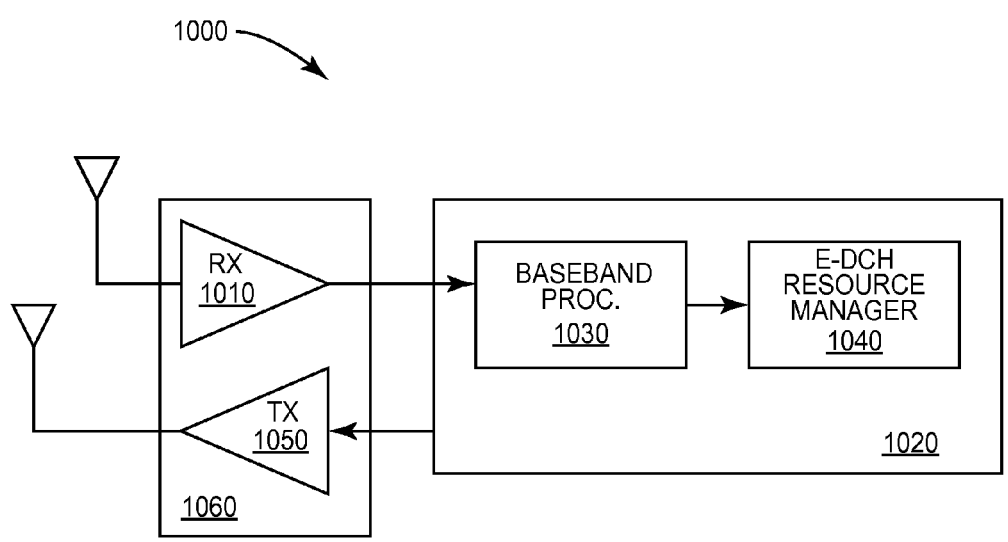
FIG. 10 is a block diagram illustrating functional elements of an example base station.

Similarly, FIG. 10 illustrates several functional elements of an example base station 1000, adapted to carry out some of the techniques discussed in detail above. Base station 1000 includes a transceiver 1060, which in turn includes a receiver circuit 1010 and a transmitter circuit 1050. Base station 1000 further includes a processing circuit 1020, which in turn includes a baseband processing circuit 1030 configured to receive a RACH preamble received from a mobile terminal via receiver circuit 1010 and an E-DCH resource manager that determines which TTI is requested by the mobile terminal, based on the preamble signature and scrambling code used by the mobile terminal in forming the RACH preamble. As discussed in detail above, the E-DCH resource manager may then choose to grant an E-DCH resource in response, or to trigger a fallback to R99 random-access resources. Note that processing circuit 1020 may be configured in the same manner as processing circuit 1510 in FIG. 8.

Accordingly, in various embodiments of the invention, processing circuits, such as the processing circuit 1510 in FIG. 8, the uplink processing circuit 1650 in FIG. 9, and the processing circuit 1020 in FIG. 10, are configured to carry out one or more of the techniques described in detail above. Likewise, other embodiments include mobile terminals and base stations including one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. Modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation. The present embodiments are thus to be considered in all respects as illustrative and not restrictive.

What is claimed is:

1. A method, in a mobile terminal, for accessing uplink resources in a wireless network that supports an enhanced-uplink random-access procedure for accessing enhanced-uplink resources and a fallback random-access procedure for access to fallback random-access resources the method comprising:
   selecting a transmission-time interval (TTI) from two or more possible TTIs;
   selecting a preamble signature from a group of one or more preamble signatures associated with enhanced-uplink resources and associated with the selected TTI;
   transmitting a random-access channel (RACH) preamble, using the selected preamble signature;
   receiving a negative acknowledgement indicator corresponding to the selected preamble signature;
   receiving an extended acknowledgement indicator value;
   determining that the received extended acknowledgement indicator value is signaling a fallback to fallback random-access resources; and
   initiating a fallback random-access procedure, using a preamble signature selected from a group of one or more preamble signatures corresponding to the fallback random-access resources.

2. The method of claim 1, wherein the fallback random-access resources are 3GPP Release-99 random-access resources and the fallback random-access procedure is a 3GPP Release-99 random-access procedure.

3. The method of claim 2, wherein the received extended acknowledgement indicator value is an indicator value reserved, from a plurality of possible indicator values, to indicate a fallback to fallback random-access resources.

4. A method, in a base station, for supporting uplink random-access procedures, the method comprising:
   receiving a random-access channel (RACH) preamble transmitted by a mobile terminal, wherein the RACH preamble uses a preamble signature and a physical random-access channel (PRACH) scrambling code;
   determining which of two or more possible transmission-time intervals (TTIs) is being requested by the mobile terminal, based on the preamble signature and the PRACH scrambling code;
   transmitting a negative acknowledgement indicator corresponding to the selected preamble signature;
   transmitting an extended acknowledgement indicator value, wherein said extended acknowledgement indicator value signals a fallback to fallback random-access resources; and
   receiving a fallback random-access preamble transmitted by the mobile terminal, wherein the fallback random-access preamble uses a preamble signature selected from a group of one or more preamble signatures corresponding to the fallback random-access resources.

5. The method of claim 4, wherein the fallback random-access are 3GPP Release-99 random-access resources and the fallback random-access preamble signature is a preamble signature associated with 3GPP Release-99 random-access resources.

6. The method of claim 4, wherein the transmitted extended acknowledgement indicator value is an indicator value reserved, from a plurality of possible indicator values, to indicate a fallback to fallback random-access resources.

7. A mobile terminal configured to access uplink resources in a wireless network that supports an enhanced-uplink random-access procedure for accessing enhanced-uplink resources and a fallback random-access procedure for access to fallback random-access resources, the mobile terminal comprising a radio transceiver and a processing circuit configured to:
   select a transmission-time interval (TTI) from two or more possible TTIs;
   select a preamble signature from a group of one or more preamble signatures associated with enhanced-uplink resources and associated with the selected TTI;
   control the radio transceiver to transmit a random-access channel (RACH) preamble, using the selected preamble signature;
   receive a negative acknowledgement indicator corresponding to the selected preamble signature, via the radio transceiver;
   receive an extended acknowledgement indicator value, via the radio transceiver;
   determine that the received extended acknowledgement indicator value is signaling a fallback to fallback random-access resources, wherein the received extended acknowledgement indicator value is an indicator value reserved, from a plurality of possible indicator values, to indicate a fallback to fallback random-access resources; and
   initiate a fallback random-access procedure, using a preamble signature selected from a group of one or more preamble signatures corresponding to the fallback random-access resources.

8. A base station configured to support uplink random-access procedures, the base station comprising a radio transceiver and processing circuitry configured to:
   receive, via the radio transceiver, a random-access channel (RACH) preamble transmitted by a mobile terminal, wherein the RACH preamble uses a preamble signature and a physical random-access channel (PRACH) scrambling code;
   determine which of two or more possible transmission-time intervals (TTIs) is being requested by the mobile terminal, based on the preamble signature and the PRACH scrambling code;
   control the radio transceiver to transmit a negative acknowledgement indicator corresponding to the preamble signature;
   control the radio transceiver to transmit an extended acknowledgement indicator value, wherein said extended acknowledgement indicator is an indicator value reserved, from a plurality of possible indicator values, to indicate a fallback to fallback random-access resources; and
   receive, via the radio transceiver, a fallback random-access preamble transmitted by the mobile terminal, wherein the fallback random-access preamble uses a preamble signature selected from a group of one or more preamble signatures corresponding to the fallback random-access resources.

9. A method, in a mobile terminal, for accessing uplink resources in a wireless network that supports an enhanced-uplink random-access procedure for accessing enhanced-uplink resources and a fallback random-access procedure for access to fallback random-access resources, the method comprising:
   selecting a preamble signature from a group of one or more preamble signatures associated with enhanced-uplink resources;
   transmitting a random-access channel (RACH) preamble, using the selected preamble signature;
   receiving a negative acknowledgement indicator corresponding to the selected preamble signature;
   receiving an extended acknowledgement indicator value;
   determining that the received extended acknowledgement indicator value is signaling a fallback to fallback random-access resources; and
   initiating a fallback random-access procedure, using a preamble signature selected from a group of one or more preamble signatures corresponding to the fallback random- access resources.

10. The method of claim 9, wherein the received extended acknowledgement indicator value is an indicator value reserved, from a plurality of possible indicator values, to indicate a fallback to fallback random-access resources.

11. A method, in a base station, for supporting uplink random-access procedures in a wireless network that supports an enhanced-uplink random-access procedure for accessing enhanced-uplink resources and a fallback random-access procedure for access to fallback random-access resources, the method comprising:
   receiving a random-access channel (RACH) preamble transmitted by a mobile terminal, wherein the RACH preamble uses a first preamble signature and a first physical random-access channel (PRACH) scrambling code, the first preamble signature corresponding to enhanced uplink random-access resources;
   transmitting a negative acknowledgement indicator corresponding to the first preamble signature;
   transmitting an extended acknowledgement indicator value, wherein said extended acknowledgement indicator value signals a fallback to fallback random-access resources; and
   receiving a fallback random-access preamble transmitted by the mobile terminal, wherein the fallback random-access preamble uses a preamble signature selected from a group of one or more preamble signatures corresponding to the fallback random-access resources.

12. The method of claim 11, wherein the transmitted extended acknowledgement indicator value is an indicator value reserved, from a plurality of possible indicator values, to indicate a fallback to fallback random-access resources.

13. A mobile terminal configured to access uplink resources in a wireless network that supports an enhanced-uplink random-access procedure for accessing enhanced-uplink resources and a fallback random-access procedure for access to fallback random-access resources, the mobile terminal comprising a radio transceiver and processing circuitry configured to:
   select a preamble signature from a group of one or more preamble signatures associated with enhanced-uplink resources;

control the radio transceiver to transmit a random-access channel (RACH) preamble, using the selected preamble signature;

receive, via the radio transceiver, a negative acknowledgement indicator corresponding to the selected preamble signature;

receive, via the radio transceiver, an extended acknowledgement indicator value;

determine that the received extended acknowledgement indicator value is signaling a fallback to fallback random-access resources; and initiate a fallback random-access procedure, using a preamble signature selected from a group of one or more preamble signatures corresponding to the fallback random-access resources.

14. The method of claim 13, wherein the received extended acknowledgement indicator value is an indicator value reserved, from a plurality of possible indicator values, to indicate a fallback to fallback random-access resources.

15. A base station configured to support uplink random-access procedures in a wireless network that supports an enhanced-uplink random-access procedure for accessing enhanced-uplink resources and a fallback random-access procedure for access to fallback random-access resources, the base station comprising a radio transceiver and processing circuitry configured to:

receive, via the radio transceiver, a random-access channel (RACH) preamble transmitted by a mobile terminal, wherein the RACH preamble uses a first preamble signature and a first physical random-access channel (PRACH) scrambling code, the first preamble signature corresponding to enhanced uplink random-access resources;

control the radio transceiver to transmit a negative acknowledgement indicator corresponding to the first preamble signature;

control the radio transceiver to transmit an extended acknowledgement indicator value, wherein the transmitted extended acknowledgement indicator value is an indicator value reserved, from a plurality of possible indicator values, to indicate a fallback to fallback random-access resources; and receive, via the radio transceiver, a fallback random-access preamble transmitted by the mobile terminal, wherein the fallback random-access preamble uses a preamble signature selected from a group of one or more preamble signatures corresponding to the fallback random-access resources.

* * * * *

UNITED STATES PATENT AND TRADEMARK OFFICE
CERTIFICATE OF CORRECTION

PATENT NO. : 8,989,117 B2
APPLICATION NO. : 13/585944
DATED : March 24, 2015
INVENTOR(S) : Ramos et al.

It is certified that error appears in the above-identified patent and that said Letters Patent is hereby corrected as shown below:

On the title page, item 57 under "ABSTRACT", in Column 2, Line 5, delete "TTIs)" and insert -- (TTIs) --, therefor.

In the drawings

In Fig. 9, Sheet 8 of 9, delete " " and insert -- --, therefor.

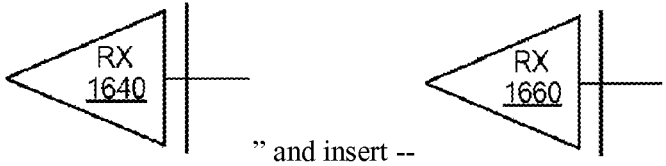

In the specification

In Column 1, Line 4, delete Heading "BACKGROUND" and insert Heading -- CROSS REFERENCE TO RELATED APPLICATIONS --, therefor.

In Column 5, Line 37, delete "illustrates" and insert -- illustrates a --, therefor.

In Column 6, Line 50, delete ""3mobile terminal,"" and insert -- "mobile terminal," --, therefor.

In Column 7, Line 18, delete "signatures to to" and insert -- signatures to --, therefor.

In Column 9, Line 2, delete "E-AI" and insert -- E-AI --, therefor.

In Column 9, Line 44, delete "Technique 1" and insert -- Technique 1: --, therefor.

In Column 10, Line 26, delete "Technique 2" and insert -- Technique 2: --, therefor.

In Column 11, Line 48, delete "unavailable ')" and insert -- unavailable') --, therefor.

Signed and Sealed this
Twenty-seventh Day of October, 2015

Michelle K. Lee
*Director of the United States Patent and Trademark Office*

CERTIFICATE OF CORRECTION (continued)
U.S. Pat. No. 8,989,117 B2

In the claims

In Column 16, Line 23, in Claim 1, delete "resources" and insert -- resources, --, therefor.